US010566883B2

(12) United States Patent
Uehara et al.

(10) Patent No.: US 10,566,883 B2
(45) Date of Patent: Feb. 18, 2020

(54) SLIDING CONTACT MEMBER, AND DC MOTOR AND GENERATOR USING SAID SLIDING CONTACT MEMBER

(71) Applicant: NISSAN MOTOR CO., LTD., Yokohama-shi, Kanagawa (JP)

(72) Inventors: Yoshitaka Uehara, Yokohama (JP); Hirotaka Miwa, Yokohama (JP); Toshikazu Nanbu, Yokohama (JP); Yoshirou Noguchi, Yokohama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 553 days.

(21) Appl. No.: 14/377,970

(22) PCT Filed: Feb. 21, 2013

(86) PCT No.: PCT/JP2013/055269
§ 371 (c)(1),
(2) Date: Aug. 11, 2014

(87) PCT Pub. No.: WO2013/125729
PCT Pub. Date: Aug. 29, 2013

(65) Prior Publication Data
US 2015/0015111 A1 Jan. 15, 2015

(30) Foreign Application Priority Data
Feb. 24, 2012 (JP) ................. 2012-038860

(51) Int. Cl.
*H02K 13/10* (2006.01)
*H02K 13/00* (2006.01)
(52) U.S. Cl.
CPC .......... *H02K 13/10* (2013.01); *H02K 13/006* (2013.01)

(58) Field of Classification Search
CPC ...... H02K 13/10; H02K 13/006; H01R 39/20; H01R 39/22; H01R 39/00; H01R 39/26; F16C 33/04
See application file for complete search history.

(56) References Cited

U.S. PATENT DOCUMENTS 3,016,447 A * 1/1962 Gage ................. B05B 7/226
118/302
2002/0022389 A1 * 2/2002 Hikata ................. H01R 13/03
439/86

(Continued)

FOREIGN PATENT DOCUMENTS

| JP | 2002-25346 A | 1/2002 |
| JP | 2010-208942 A | 9/2010 |
| JP | 2010208942 A * | 9/2010 |

OTHER PUBLICATIONS

JP 2010208942 A machine translation Sep. 30, 2016.*
JP 2010208942 A machine translation abstract.*

*Primary Examiner* — Mang Tin Bik Lian
*Assistant Examiner* — Leda T Pham
(74) *Attorney, Agent, or Firm* — Drinker Biddle & Reath LLP

(57) ABSTRACT

The present invention is a sliding contact member, including a powder compact portion that contains an electrically conductive diamond and an electrically conductive binder, and is provided at least on a sliding contact surface of either or both of two sliding contact members slidably in contact with each other. The sliding contact members are applied to DC motors, generators and the like.

10 Claims, 12 Drawing Sheets

(56) References Cited

U.S. PATENT DOCUMENTS

| | | | |
|---|---|---|---|
| 2003/0155837 A1* | 8/2003 | Takahashi | H01R 39/26 310/253 |
| 2006/0131983 A1* | 6/2006 | Hamamatsu | H01R 39/20 310/251 |
| 2006/0175953 A1* | 8/2006 | Swain | C25B 11/0442 313/311 |
| 2014/0099048 A1* | 4/2014 | Kurata | F16C 17/02 384/42 |

* cited by examiner

SLIDING CONTACT MEMBER, AND DC MOTOR AND GENERATOR USING SAID SLIDING CONTACT MEMBER

TECHNICAL FIELD

The present invention relates to a sliding contact member, and a DC motor and a generator using said sliding contact member.

BACKGROUND ART

One such conventional technique is disclosed in Patent Document 1, where the product is referred to as an "electrically conductive member".

The electrically conductive member disclosed in Patent Document 1 establishes electrical connection by a plurality of electrically conductive members making contact with each other, in which at least one of the electrically conductive members includes an electrically conductive hard carbon-containing film at a portion to be in contact with the other member. This electrically conductive member is used as contacts of keys.

CITATION LIST

Patent Literature

Patent Document 1: Japanese Patent Unexamined Publication No. 2002-25346

SUMMARY OF INVENTION

Technical Problem

However, if the electrically conductive member disclosed in Patent Document 1 is used as, for example, a brush and a commutator of drive motors or generators, the electric power flowing through the brush increases. Furthermore, the electrically conductive member is subjected to a higher sliding speed and a higher sliding contact pressure as the sliding speed of the brush increases.

This increases heat generation in the brush, which causes thermal softening of the material. As a result, the brush or the counterpart thereof, i.e. the commutator, is subjected to a greater amount of wear.

Another problem is that the heat generated in the brush and commutator does not sufficiently diffuse over the sliding surface, which causes a local temperature rise that softens the material.

It is an object of the present invention to provide a sliding contact member that reduces wear as well as heat generation, and a DC motor and a generator using the sliding contact member.

Solution to Problem

The present invention for solving the above-described problems is as follows.

The sliding contact member of the present invention reduces heat generation and resulting wear by providing a powder compact portion that contains an electrically conductive diamond and an electrically conductive binder and is placed at a sliding contact portion of either or both of two sliding contact members slidably in contact with each other.

The DC motor and the generator of the present invention use the above-described sliding contact member as a brush or a commutator. This promotes heat diffusion in the brush and commutator, and thereby prevents heat from locally rising.

Advantageous Effects of Invention

With the present invention, it is possible to reduce wear and to suppress heat generation since a powder compact portion that contains the electrically conductive diamond and the electrically conductive binder is provided at the sliding contact portion of either or both of two sliding contact members slidably in contact with each other.

BRIEF DESCRIPTION OF DRAWINGS

The patent or application file contains at least two drawings executed in color. Copies of this patent or patent application publication with color drawing(s) will be provided by the Office upon request and payment of the necessary fee.

DESCRIPTION OF EMBODIMENTS

Figure 1:
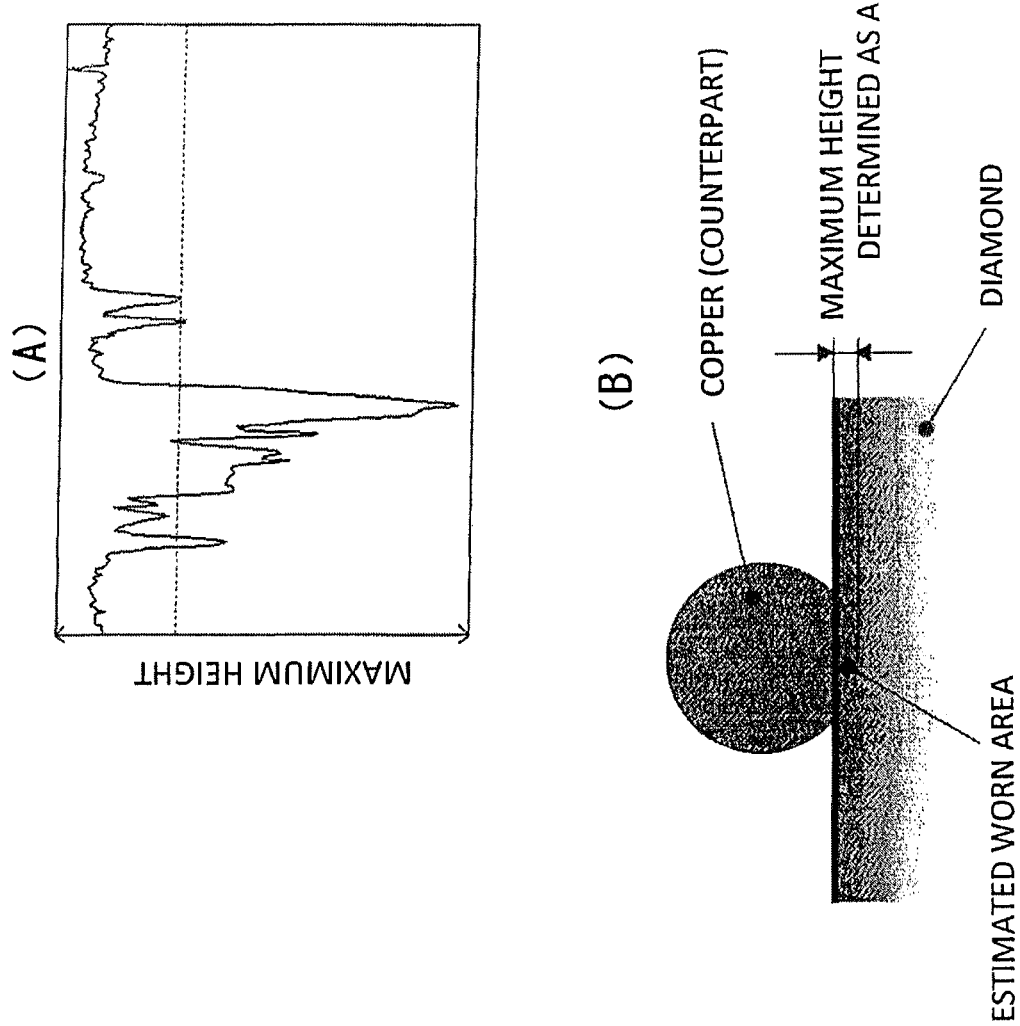
FIG. 1 is (A) a surface roughness curve measured by an AFM (atomic force microscope) illustrating the amount of wear of diamond, and (B) a schematic view illustrating the determination of an estimated area of contact with a counterpart.

Hereinafter, embodiments of the present invention will be described.

A sliding contact member of the present invention includes a powder compact portion that contains an electrically conductive diamond and is provided at least at a sliding contact portion of either or both of two sliding contact members slidably in contact with each other.

The term "electrically conductive diamond" refers to a diamond semiconductor doped with an impurity (e.g. boron (B)).

A compound semiconductor may be used as the "electrically conductive binder".

Such compound semiconductors include, for example, Zn, Cd, Hg, B, Al, Ga, In, Tl, N, P, As, Sb, Bi, O, S, Se, Te, Po, and the like.

With the above-described configuration, an improvement in heat conduction in the powder compact portion enables better heat dissipation, and the hardened surface layer improves wear resistance.

Also, the improvement in heat conduction improves the discharge resistance, which results in reduced electrical abrasion. Further, since inexpensive diamond particles are used for the powder compact portion, it is possible to produce the sliding contact member at low cost.

The powder compact portion contains both the electrically conductive diamond powder and the electrically conductive binder that binds the electrically conductive diamond powder together, so the strength and the adhesiveness of the electrically conductive diamond powder can be improved. This improves the apparent strength, heat conductivity and electrical conductivity of the powder compact portion.

A powder having a specific electrical resistance lower than the electrically conductive diamond particles is used as the electrically conductive binder, so the specific electrical resistance between the electrically conductive diamond powder is reduced, which improves the above-described apparent electrical conductivity of the powder compact portion.

By increasing the volume ratio of the electrically conductive diamond to 50% or more, the volume ratio of the electrically conductive diamond in the powder compact portion is improved, which improves the apparent strength of the powder compact portion. Therefore, the wear resistance and the seizing resistance can be improved.

By decreasing the volume ratio of the electrically conductive diamond in reverse proportion to a distance from the sliding contact surface in the thickness direction, it is possible to reduce the production cost as well as to reduce the volume ratio of the electrically conductive diamond in the whole powder compact portion without decreasing the hardness, heat conductivity, heat dissipation performance and electrical conductivity of the sliding contact surface.

By using an electrically conductive diamond having a specific electrical resistance of not more than $1 \times 10^{-1}$ $\Omega \cdot cm$, the specific electrical resistance of the electrically conductive diamond powder is decreased. Therefore, the apparent electrical conductivity of the powder compact portion can be improved.

By using an electrically conductive diamond having a powder size of not more than 5 μm, it is possible to reduce the surface roughness of the worn sliding contact surface of the powder compact portion and to reduce mechanical abrasion.

By using any one of Cu, Al, Ni, Ti, Zn, Co, Au and Ag as a low-specific electrical resistance material, the specific electrical resistance of the powder other than the electrically conductive diamond can be decreased. Therefore, the apparent electrical conductivity of the powder compact portion can be improved. Furthermore, as this enables production by powder deposition, the sliding contact member can be produced at low cost.

By using a powder compact portion having a thickness of 100 μm or more, the heat dissipation of the powder compact portion is improved. Therefore, it is possible to prevent local temperature rise in the sliding contact surface, which can reduce wear due to heat degradation.

By using a powder compact portion having a heat conductivity of 500 W/(m·K) or more, the heat conductivity of the powder compact portion is improved. Therefore it is possible to prevent local temperature rise in the sliding contact surface, which can reduce wear due to heat degradation.

By using sintering to produce the above-described powder compact portion, the high density compact portion can be produced at low cost.

By using powder deposition to produce the above-described powder compact portion, the powder compact portion having higher density can be produced at even lower cost.

By using the above-described sliding contact member for either or both of a brush and a commutator, DC motors and generators can be produced at low cost.

EXAMPLES

First, a method for measuring the amount of wear (specific amount of wear) of diamond will be described.

The wear of diamond could not be measured by using basic measuring methods. Accordingly, the amount of wear of diamond was calculated from the maximum height of a surface roughness curve measured by an AFM (atomic force microscope) (see FIG. 1(A)) and an expected area of contact with a counterpart (see FIG. 1(B)).

Example 1

(Materials Used) A sliding contact member in which a powder compact portion, made of an electrically conductive diamond powder bound by cobalt (an electrically conductive binder), is formed on the sliding contact surface.

(Production Method) The powder compact portion was produced by sintering.

Figure 2:
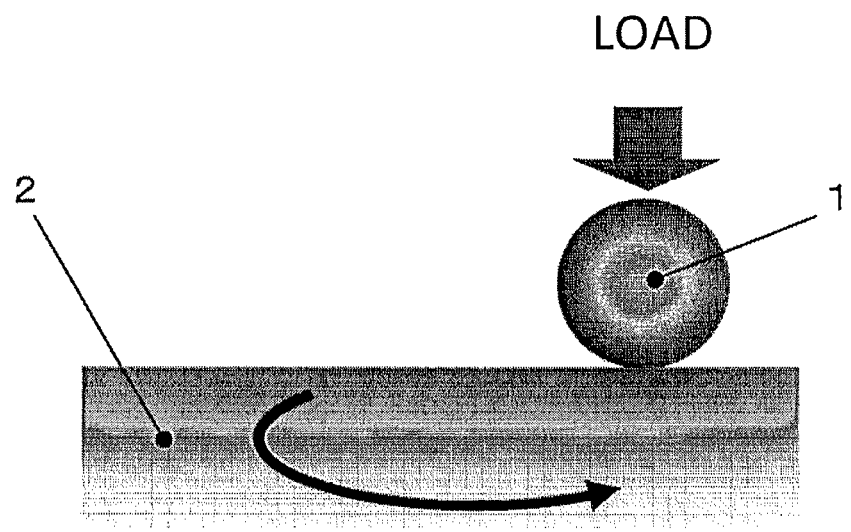
FIG. 2 is an explanatory view illustrating a first evaluation method.

(Evaluation Method) FIG. 2 is an explanatory view illustrating a first evaluation method, where a copper ball and the sliding contact member of the present invention are indicated by reference signs 1 and 2 respectively. The arrow in FIG. 2 indicates the rolling direction of the ball 1.

The amount of wear was evaluated by the ball-on-disk method (300 min) as illustrated in FIG. 2.

Figure 10:
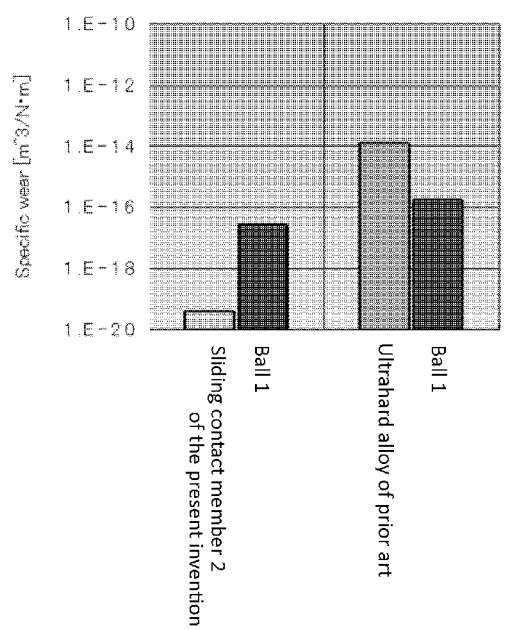
FIG. 10 is a bar graph depicting illustrating evaluation results of a first evaluation method, according to embodiments of the present disclosure.

(Evaluation Result) As shown in FIG. 10, the wear resistance is drastically improved. Furthermore, the aggression to the counterpart (ball 1) is low.

Example 2

(Materials Used) A sliding contact member in which a powder compact portion, made of electrically conductive diamond powder bound by cobalt, is formed on the sliding contact surface.

(Production Method) The powder compact portion was produced by sintering.

Figure 3:
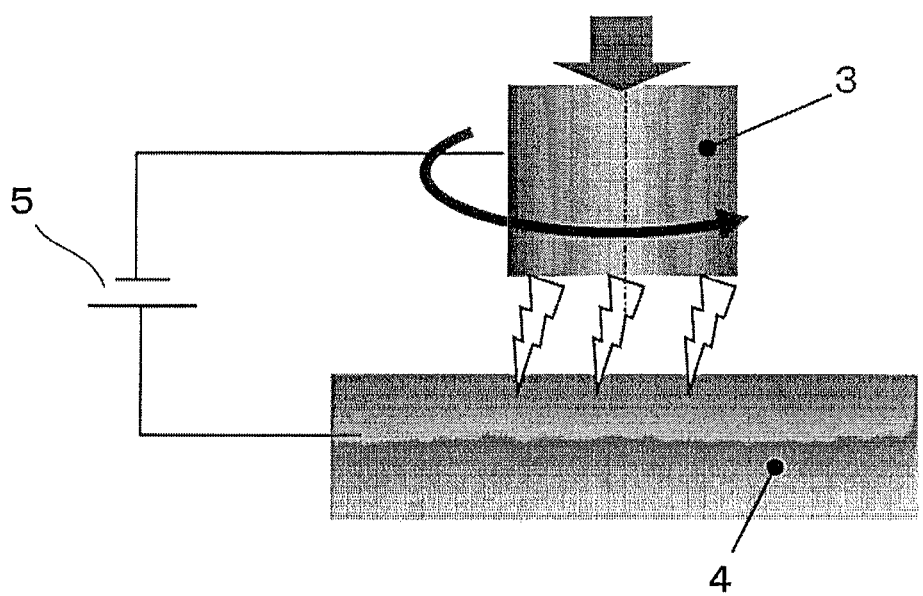
FIG. 3 is an explanatory view illustrating a second evaluation method.

(Evaluation Method) FIG. 3 is an explanatory view illustrating a second evaluation method, where a copper electrode, the sliding contact member of the present invention and a DC power source for applying electric current between them are indicated by reference signs 3, 4 and 5 respectively. The arrow in FIG. 3 indicates the moving direction of the electrode 3.

The discharge resistance (the amount of wear) was evaluated by the electrical discharge machining as illustrated in FIG. 3.

Figure 11:
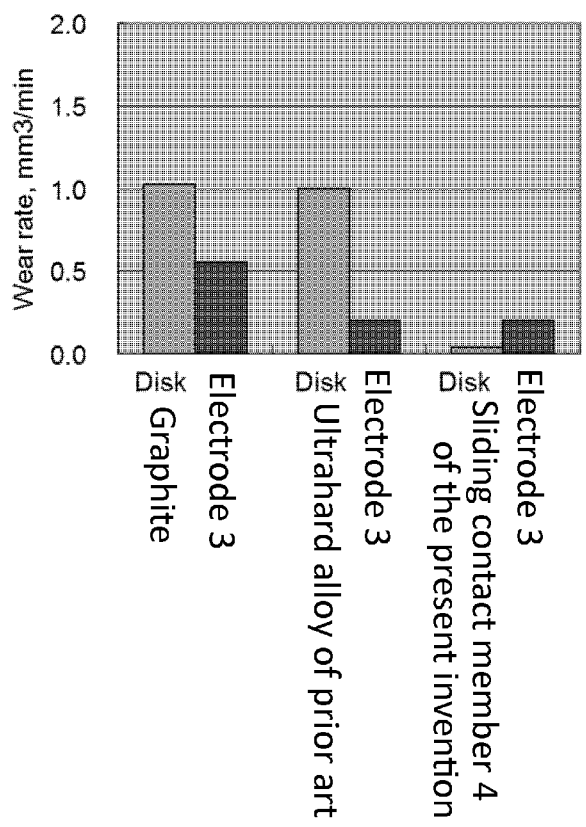
FIG. 11 is a bar graph depicting illustrating evaluation results of a second evaluation method, according to embodiments of the present disclosure.

(Evaluation Result) As shown in FIG. 11, the wear resistance is drastically improved. Furthermore, the aggression to the counterpart (electrode 3) is low.

Example 3

(Materials Used) A sliding contact member in which a powder compact portion, made of electrically conductive diamond powder bound by cobalt, is formed on the sliding contact surface.

(Production Method) The powder compact portion was produced by sintering.

Figure 4:
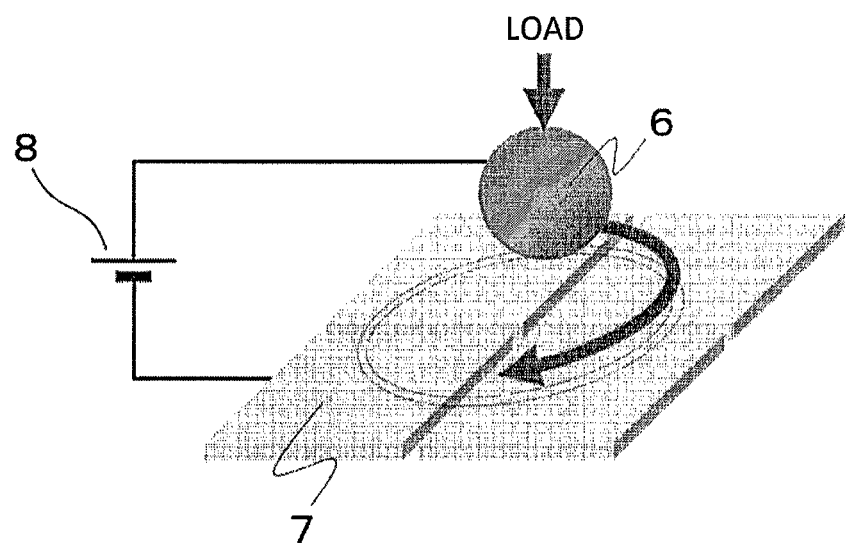
FIG. 4 is an explanatory view illustrating a third evaluation method.

(Evaluation Method) FIG. 4 is an explanatory view illustrating a third evaluation method, where a copper ball, the sliding contact member of the present invention and a DC power source for providing electricity between them are indicated by reference signs 6, 7 and 8 respectively. The arrow in FIG. 4 indicates the rolling direction of the ball 6.

The amount of wear was evaluated by the electrified slide test as illustrated in FIG. 4.

Figure 12:
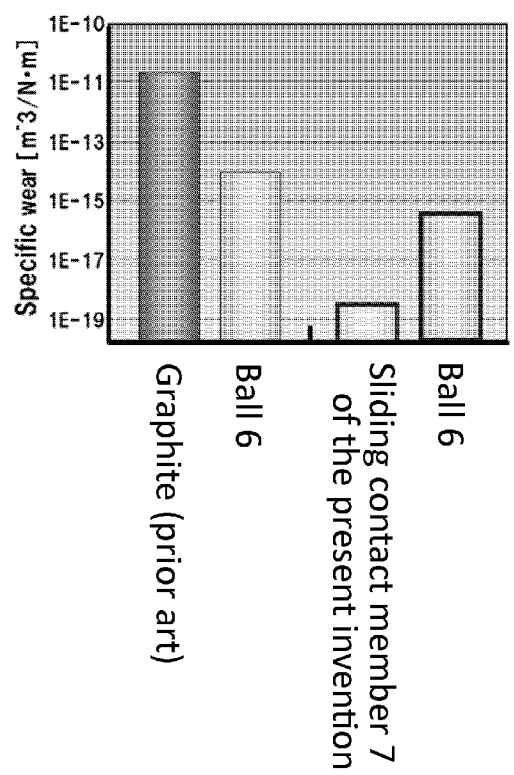
FIG. 12 is a bar graph depicting illustrating evaluation results of a third evaluation method, according to embodiments of the present disclosure.

(Evaluation Result) As shown in FIG. 12, the wear resistance is drastically improved. Furthermore, the aggression to the counterpart (ball 6) is low.

Example 4

(Materials Used) A sliding contact member in which a powder compact portion, made of electrically conductive diamond powder bound by copper, is formed on the sliding contact surface.

(Production Method) The powder compact portion was produced by powder deposition.

Figure 5:
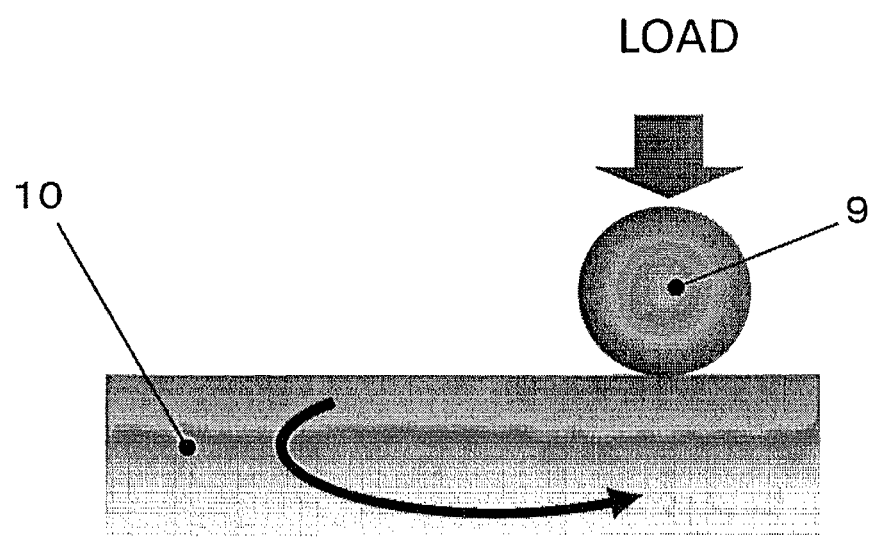
FIG. 5 is an explanatory view illustrating a fourth evaluation method.

(Evaluation Method) FIG. 5 is an explanatory view illustrating a fourth evaluation method, where a copper ball and the sliding contact member of the present invention are indicated by reference signs 9 and 10 respectively. The arrow in FIG. 5 indicates the rolling direction of the ball 9.

The seizing resistance was evaluated by the seizing test as illustrated in FIG. 5.

(Evaluation Result) While a copper plate seized in a short time, the sliding contact member of the present invention did not seize until the powder compact portion was worn out.

Example 5

Figure 6:
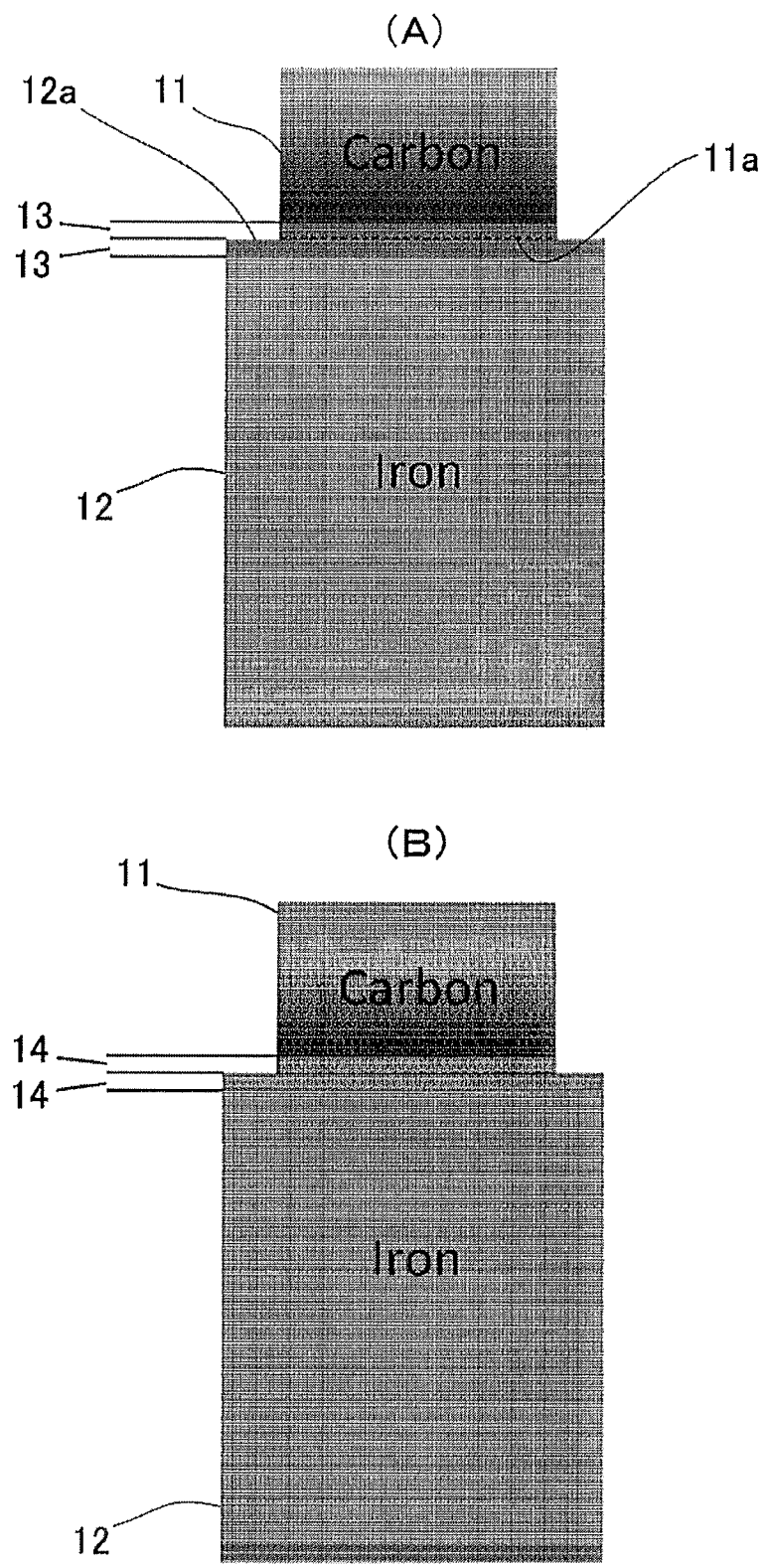
FIG. 6 is explanatory views illustrating a fifth evaluation method, where (A) is a schematic explanatory view of two sliding contact members each having a 10 μm thick powder compact portion, and (B) is a schematic explanatory view of two sliding contact members each having a 500 μm thick powder compact portion.
Figure 7:
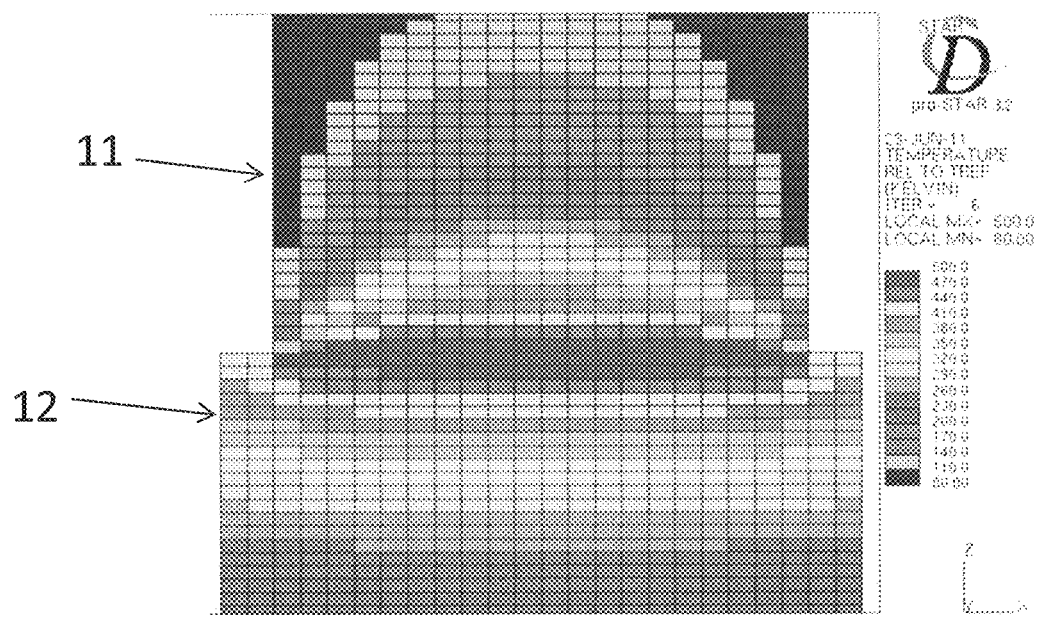
FIG. 7 is an explanatory view illustrating a simulation result when the thickness of both powder compact portions is 10 μm.
Figure 8:
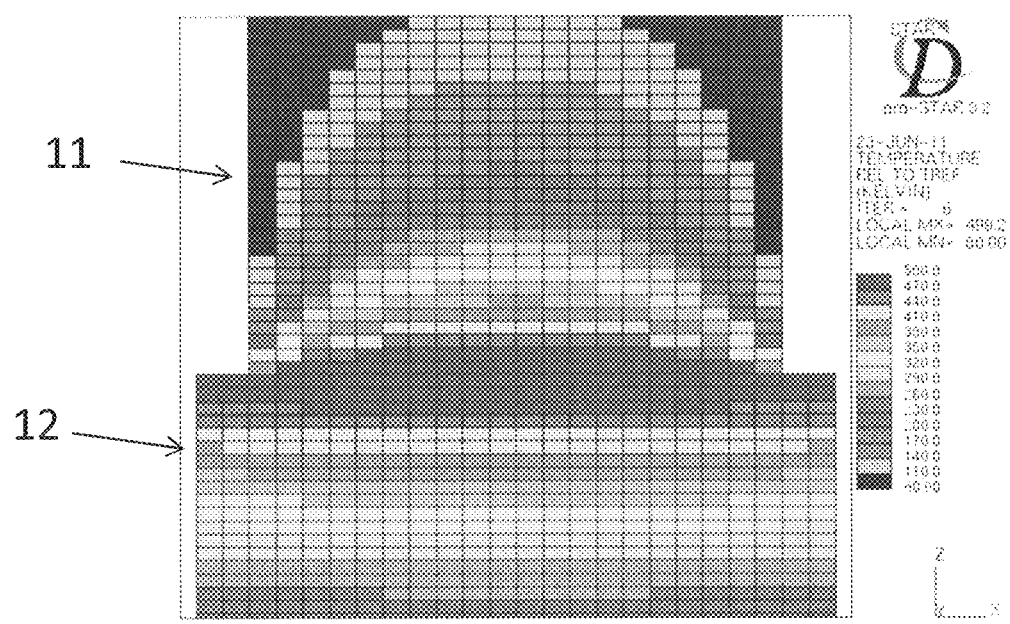
FIG. 8 is an explanatory view illustrating a simulation result when the thickness of the powder compact portions is 500 μm.

FIG. 6 is an explanatory view illustrating a fifth evaluation method, where (A) is a schematic explanatory view of two sliding contact members each having a 10 μm thick powder compact portion, and (B) is a schematic explanatory view of two sliding contact members each having a 500 μm thick powder compact portion. FIG. 7 is an explanatory view illustrating a simulation result when the thickness of both powder compact portions is 10 μm, and FIG. 8 is an explanatory view illustrating a simulation result when the thickness is 500 μm.

In FIG. 6(A), one sliding contact member, which is indicated by reference sign 11, and the other sliding contact member, which is indicated by reference sign 12, are slidably in contact with each other. They are made of carbon and iron (copper) respectively.

On both sliding contact surfaces 11a and 12a of the respective sliding contact members 11 and 12, 10 μm thick powder compact portions 13, 13 are formed. In FIG. 6(B), 500 μm thick powder compact portions 14, 14 are formed on both sliding contact surfaces 11a and 12a of the respective sliding contact members 11 and 12.

(Material Used) A material having the same thermal properties as the powder compact portion made of the electrically conductive diamond powder was used. The heat dissipation was analyzed when the thickness of the powder compact portion was 10 μm (FIG. 6(A)) or 500 μm (FIG. 6(B)).

(Analysis Condition) It was simulated that the temperature of the sliding contact surface was constantly kept at 500° C. by heat generation.

(Evaluation Method) The seizing resistance was evaluated according to the seizing test as illustrated in FIGS. 6(A) and 6(B).

(Evaluation Result) The heat dissipation increases as the thickness of the powder compact portion was increased.

As is clear from FIGS. 7 and 8, the increase in thickness of the powder compact portion 13 improves the heat dissipation property.

Figure 9:
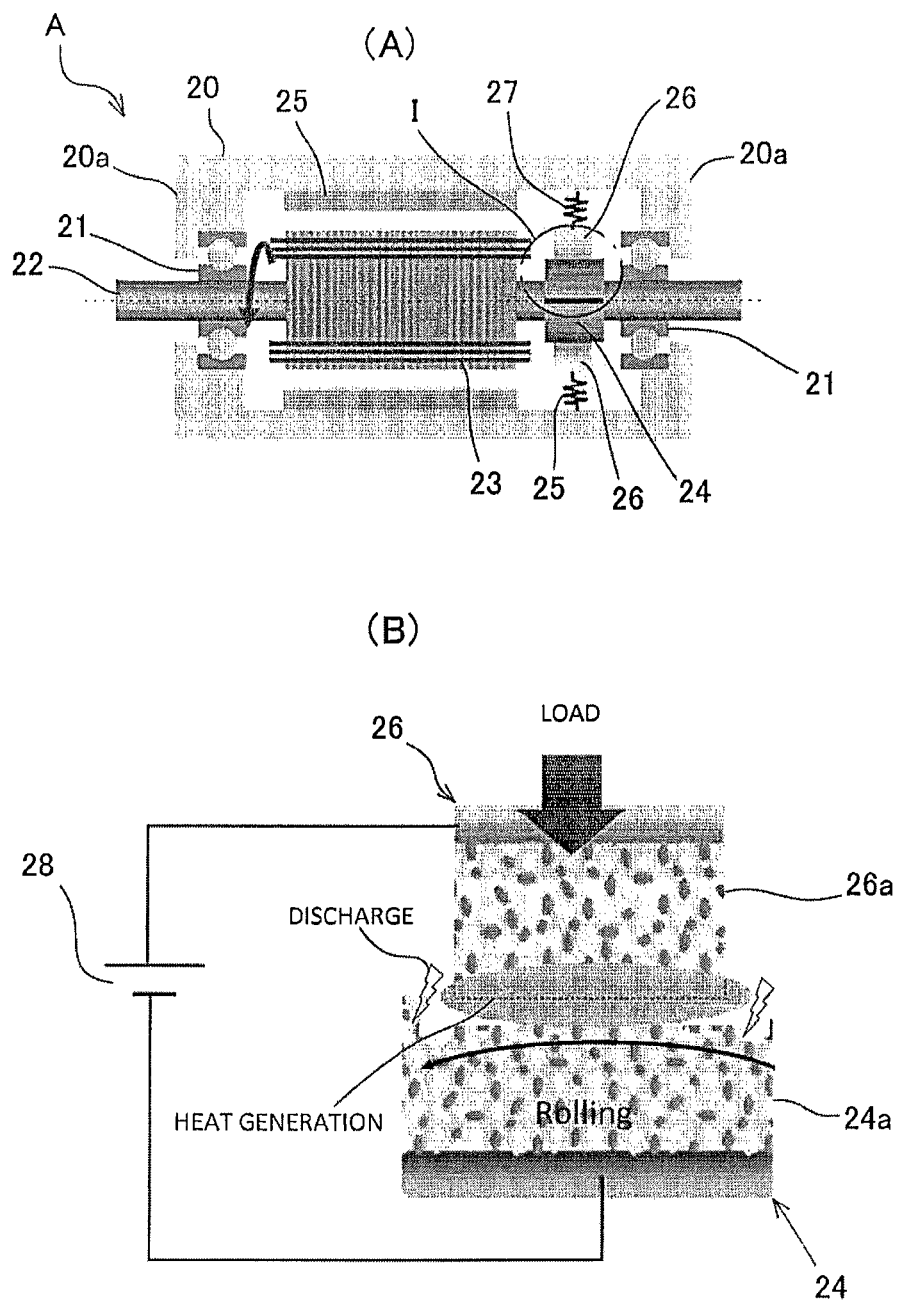
FIG. 9 is (A) a cross sectional view schematically illustrating the structure of an exemplary DC brush motor, and (B) a magnification of the part of (A) indicated by envelope I.

On the other hand, the above-described sliding contact member can be used for a DC brush motor of FIG. 9. FIG. 9 is (A) a cross sectional view schematically illustrating the structure of an exemplary DC brush motor, and (B) a magnification of the part of (A) indicated by envelop I.

The DC brush motor A of FIG. 9(A) includes an approximately cylindrical case 20, bearings 21, 21 that are coaxially fitted in respective opposing end faces 20a, 20a of the case 20, and a drive shaft 22 that is rotatably supported by the bearings 21, 21.

A coil 23 and a commutator 24 are provided on the drive shaft 22, and a magnet 25 is provided on the inner wall of the case 20.

Brushes 26 are provided on the case 20 via springs 27, which are slidable on the commutator 24. A DC power source is indicated by reference sign 26.

The commutator 24 includes a powder compact portion 24a of a requisite thickness that has the above-described configuration and is formed on a sliding contact surface with the brushes 26. Similarly, each of the brushes 26 includes a powder compact portion 26a of a requisite thickness that has the above-described configuration and is formed on a sliding contact surface with the commutator 24.

The brushes 26 and the commutator 24 of the above-described DC motor A or those of a generator wear away by (1) mechanical abrasion and (2) electrical abrasion (loss of the material due to electrical discharge).

With regard to (1), the abrasion is promoted by thermal softening of the material, which is caused by heat generation at both sliding contact surfaces of the brushes 26 and the commutator 24. With regard to (2), the discharge resistance and heat conductivity are reverse proportional to the amount of wear.

By using the sliding contact member of the present invention, the hardness of the sliding contact surface is increased, and the mechanical wear resistance is therefore improved. In addition, since the heat conductivity of the sliding contact surfaces is improved, mechanical abrasion as well as heat softening of the material is reduced.

The present invention is not limited to the above-described embodiments, and includes the following variations.

In the above-described embodiments, the sliding contact member is applied to a drive brush motor for example. Similarly, it is also applicable to a brush and commutator of generators.

It should be understood that the sliding contact member is suitably applicable to not only drive brush motors and generators but also other devices. The same advantageous effects as those of drive brush motors can also be obtained in such cases.

In the above-described embodiments, the powder compact portion is provided on the sliding contact surface of the sliding contact member. However, the whole sliding contact member may be made of the material of the powder compact portion.

REFERENCE SIGNS LIST 11, 12 sliding contact member
11a, 12a powder compact portion

The invention claimed is:

1. A sliding contact member, comprising: a powder compact portion that contains an electrically conductive diamond powder and an electrically conductive binder to bind the powder to each other, the powder compact portion is provided at least on a sliding contact surface of either or both of two sliding contact members slidably in contact with each other, and the powder compact portion is produced by powder deposition which keeps the electrically conductive diamond powder in powdered form, wherein the powder compact portion is configured such that the volume ratio of the electrically conductive diamond decreases in reverse proportion to a distance from the sliding contact surface in a thickness direction of the powder compact portion.

2. The sliding contact member according to claim 1, wherein the electrically conductive binder has a specific electrical resistance lower than the conductive diamond powder.

3. The sliding contact member according to claim 1, wherein the powder compact portion contains the electrically conductive diamond at a volume ratio of 50% or more.

4. The sliding contact member according to claim 1, wherein the electrically conductive diamond is a powder having a specific electrical resistance of $1 \times 10^{-1}$ $\Omega \cdot$cm or less.

5. The sliding contact member according to claim 4, wherein a powder size of the electrically conductive diamond is 5 µm or less.

6. The sliding contact member according to claim 1, wherein the electrically conductive binder is any one of Cu, Al, Ni, Ti, Zn, Co, Au and Ag.

7. The sliding contact member according to claim 1, wherein a thickness of the powder compact portion is 100 µm or more.

8. The sliding contact member according to claim 1, wherein a heat conductivity of the powder compact portion is 500 W/(m·K) or more.

9. A DC motor, wherein the sliding contact member according to claim 1 is used in either or both of a brush and a commutator.

10. A generator, wherein the sliding contact member according to claim 1 is used in either or both of a brush and a commutator.

* * * * *